United States Patent

Iizuka

[11] 4,189,213
[45] Feb. 19, 1980

[54] ZOOM LENS SYSTEM
[75] Inventor: Yutaka Iizuka, Tokyo, Japan
[73] Assignee: Nippon Kogaku K.K., Tokyo, Japan
[21] Appl. No.: 801,353
[22] Filed: May 27, 1977
[30] Foreign Application Priority Data May 31, 1976 [JP] Japan .................................. 51-62427

[51] Int. Cl.² ............................................. G02B 15/18
[52] U.S. Cl. .................................................. 350/184
[58] Field of Search ................................. 350/184, 186

[56] References Cited
U.S. PATENT DOCUMENTS

| | | | |
|---|---|---|---|
| 3,970,367 | 7/1976 | Tsugi | 350/184 |
| 3,972,591 | 8/1976 | Suwa | 350/184 |

Primary Examiner—Conrad J. Clark
Attorney, Agent, or Firm—Shapiro and Shapiro

[57] ABSTRACT

A zoom lens system comprises, in order from the object side, a positive first lens group, a negative second lens group, a positive third lens group, a negative fourth lens group and a positive fifth lens group. The first lens group includes a positive lens component comprising a negative and a positive lens cemented together, and a positive meniscus lens component convex to the object side. The second lens group includes a negative lens component and a negative lens component comprising a negative lens and at least one positive lens cemented together. The third lens group includes at least one positive lens component and a positive lens component comprising a positive and a negative lens cemented together. The fourth lens group includes a negative lens component. The fifth lens group comprises a forward and a rearward group spaced apart a substantial distance from each other by an air space. The forward group includes a positive meniscus lens component convex to the object side, and the rearward group includes a negative meniscus lens component convex to the image side and a positive lens component.

6 Claims, 6 Drawing Figures

ZOOM LENS SYSTEM

BACKGROUND OF THE INVENTION

1. Field of the Invention

This invention relates to a zoom lens system comprising five lens groups, and more particularly is directed to a zoom lens system of high performance for use with 35 mm still cameras which has a large value of a zoom ratio; that is, the ratio of the longest focal length to the shortest focal length, which covers the range of a standard lens on the shortest focal length side, and which is bright.

2. Description of the Prior Art

Most zoom lenses are of the type in which a magnification changing system is followed by a relay lens system capable of correcting aberrations over the entire range of the focal length. It is known that the greater the size of the magnification changing system relative to the relay lens system, the more reduced the variation in aberration resulting from zooming. Therefore, in the field of zoom lenses for small motion picture cameras wherein the optical system is relatively large with respect to the picture-taking image field, lenses having a wide zoom range and large aperture are known. However, in zoom lenses for 35 mm still cameras wherein the picture-taking image field is diagonally about six times the size of 8 mm film, various difficulties are encountered when it is desired to design a lens having a wide zoom range and large aperture which is compact and which possesses high performance. In a zoom lens system of wide zoom range, the amount of magnification change is great and accordingly, the proportion of the magnification changing system relative to the length of the entire optical system must be quite large, and thus, compactness of the entire system would presuppose a reduction in the size of the magnification changing system. This means that the Petzval sum in the magnification changing system becomes excessive toward the negative, and also gives rise to the tendency that correction of the variation in aberration resulting from zooming becomes more difficult. If it is desired to correct the Petzval sum by the relay lens system, there will arise the necessity of increasing the full length of the relay lens system itself, and this will negate the effect of the purposely achieved compactness of the magnification changing system. For the foregoing reasons, zoom lenses of this type have suffered from the following problems. For the correction of the Petzval sum, the full length exceeds the value of the longest focal length; that is, the telephoto ratio (the ratio of the distance from the lens surface of the lens system closest to the object side to the focal plane to the longest focal length) is greater than 1.0. Moreover, the curvature of image field and astigmatism resulting from under-correction of the Petzval sum are appreciable over the entire range of magnification change. Also, on the long focal length side, the fact that the magnification changing system is used under the brightest condition induces imperfect correction of the high order spherical aberration, as well as under-correction of the spherochromatism. On the long focal length side, which belongs to the range of the so-called telephoto lens, correction of chromatic aberration is also important; the residual amount of lateral chromatic aberration is not negligible. On the short focal length side, imbalance of the lateral chromatic aberration resulting from the difference in angle of view is also appreciable. Further, for short distance shooting on the long focal length side the spherical aberration becomes excessive toward the negative and curvature of image field becomes excessive toward the positive, and thus, better correction has been a desirable objective.

SUMMARY OF THE INVENTION

It is an object of the present invention to eliminate all the above-noted problems and to provide a bright, compact and high-performance zoom lens system for use with 35 mm still cameras which covers the range of a standard lens on the shortest focal length side and which has a wide zoom range; namely, a zoom ratio amounting to six and which has a relative aperture of 1:4.5.

According to the present invention, the zoom lens system comprises, in order from the object side, a positive first lens group including a positive lens component comprising a negative and a positive lens cemented together and a positive meniscus lens component convex to the object side, a negative second lens group including a negative lens component and a negative lens component comprising a negative lens and at least one positive lens cemented together, a positive third lens group including at least one positive lens component and a positive lens component comprising a positive and a negative lens cemented together, a negative fourth lens group including a negative lens component, and a positive fifth lens group comprising a forward and a rearward group spaced apart a substantial distance from each other by an air space, the forward group including a positive meniscus lens component convex to the object side, the rearward group including a negative meniscus lens component convex to the image side and a positive lens component. The first lens group is movable on the optical axis of the system to perform the focusing function, and the second lens group is linearly movable on the optical axis and cooperable with the third lens group non-linearly movable simultaneously with but in the opposite direction to the second lens group to perform the magnification changing function, maintaining a predetermined image field position while converging the light flux over the entire magnification changing range. The fourth and the fifth lens groups are both fixed for the magnification change and the focusing to thereby form a so-called relay lens system.

The invention will become more fully apparent from the following detailed description of some preferred embodiments thereof taken in conjunction with the accompanying drawings.

DESCRIPTION OF THE PREFERRED EMBODIMENTS

Figure 1:
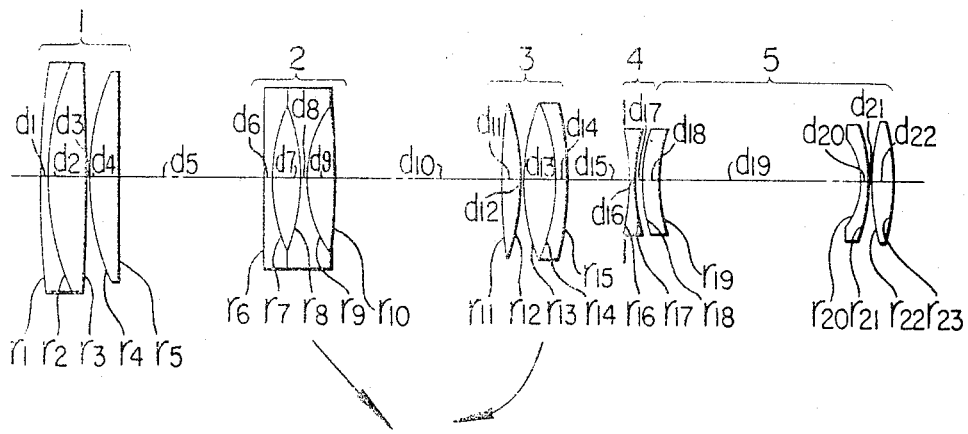
FIGS. 1, 2 and 3 show the lens constructions according to a first, a second and a third embodiment, respectively, of the present invention.

The construction of the zoom lens system according to the present invention comprises, in the order from the object side, a positive first lens group, a negative second lens group, a positive third lens group, a negative fourth lens group and a positive fifth lens group.

The first lens group chiefly has the focusing function by being moved toward the object side in the entire range of the variable focal length. The second lens group which is linearly movable, together with the third lens group which is non-linearly movable in the opposite direction, has a magnification changing function of maintaining the light flux at a predetermined image field position while converging the light flux over the entire range of magnification change. The fourth and the fifth lens groups are both fixed for magnification changing and focusing and constitute a so-called relay lens system.

Describing the lens construction of each lens group in greater detail, the first lens group comprises a positive lens component consisting of a negative lens and a positive lens cemented together and a positive meniscus lens component convex to the object side. The second lens group comprises a negative lens component and a negative lens component consisting of a negative lens and a positive lens cemented together, the third lens group comprises a positive lens component and a positive lens component consisting of a positive lens and a negative lens cemented together. The fourth lens group comprises a negative lens component. The fifth lens group comprises a forward lens group and a rearward lens group spaced apart a substantial distance. The forward group consists of a positive meniscus lens component convex to the object side, and the rearward group consists of a negative meniscus lens component convex to the image side and a positive lens component.

The power arrangement of each group will not be described, followed by the specific construction of the respective lens components of each group. The power arrangement satisfied the following conditions:

$$2.9 fW < f_1 < 3.7 fW \quad (1),$$

$$0.8 fW < |f_2| < 1.1 fW \quad (2),$$

$$1.0 fW < f_3 < 1.4 fW \quad (3),$$

$$1.4 fW < |f_4| < 1.7 fW \quad (4), \text{ and}$$

$$2.0 fW < f_5 < 2.4 fW \quad (5),$$

where $f_1$, $f_2$, $f_3$, $f_4$ and $f_5$ represent the focal lengths of the first, second, third, fourth and fifth lens groups, respectively, and fW the shortest focal length of the entire system provided by zooming.

Condition (1) specifies the focal length of the first lens group. It also specifies the size of the magnification changing system relative to the relay lens in response to the property of the magnification changing system in the zoom lens. If the magnification changing system is greater in size, the variation in aberration resulting from zooming may be correspondingly smaller and the aggravation of Petzval sum toward the negative value may also be reduced, and further, the variation in aberration at short distance resulting from the focusing by the movement of the first lens group may also be smaller. On the other hand however, increase in size of the magnification changing system means a greater size of the entire optical system, together with an increase in the amount of movement required of the first lens group for short-distance shooting. This is in direct contradiction to the desire to achieve compactness of the optical system. Therefore, the focal length $f_1$ of the first lens group must be optically determined with these factors taken into account. If $f_1$ exceeds the upper limit of condition (1) above, the telephoto ratio will exceed 1.0, and compactness of the entire system cannot be obtained. Conversely, if $f_1$ exceeds the lower limit of condition (1), the Petzval sum will be excessively great toward the negative so that astigmatism will have to be provided for the correction of curvature of image field and spherical aberration and curvature of image field will be corrected at the opposite ends of zooming, but the bulge in the intermediate portion will not be completely removed. As a result, there will be excessive astigmatic variation from a barrel shape to a bobbin shape.

Condition (2) determines the focal length of the second lens group among the sizes of the magnification changing system determined by condition (1), and coupled with condition (3), it also indicates the magnitude of the magnification varying action of the second lens group. The zoom lens system of the invention is of the type in which the second and the third lens groups, which are spaced apart from each other, are moved away from each other to effect magnification change for lower magnification and are moved toward each other to effect magnification change for higher magnification. The magnification changing action is shared by the second and the third lens groups. Therefore, even after the size of the magnification changing system relative to the relay lens has been determined, the construction of the magnification changing system may be varied depending on the values chosen for the focal lengths of the second and the third lens groups. Such values must be chosen properly, for, if the upper limit of condition (2) is exceeded, the refractive power becomes weaker so that the stroke to obtain the desired magnification becomes longer, and this results in substantial increase of the total length and increased height of the principal ray passing through the first lens group, which in turn leads to an increase in the aperture needed for the first lens group. Conversely, if the lower limit of condition (2) is exceeded, the effective F-number of the second lens group becomes small to thereby render the correction of spherical aberration difficult; also, the intersection point of the non-axial principal ray with respect to the second lens group is substantially enlarged, thereby making it difficult to correct distortion.

Condition (3) specifies the focal length of the third lens group. The third lens group has the function of a so-called compensator which always maintains the image point created by the magnification changing system at a predetermined position; this group also has the function of positively performing magnification change, as previously described. Therefore, setting of the focal length of this lens group not only affects the size of the magnification changing system but also plays an important role in correcting the variation in aberration resulting from magnification change. More particularly, the third lens group is moved in the direction opposite to the direction of movement of the second lens group to thereby maintain the image point at a predetermined position, but since the movement of the second lens group is linear, the movement curve of the third lens group becomes non-linear so that the ratio of the amount of movement of the third lens group to that of the second lens group becomes sharply greater when the condition of 1x magnification is exceeded. Therefore, if the third lens group is used at a high magnification, the stroke of the second lens group becomes shorter while the amount of movement of the third lens group is increased, and thus, the use of the third lens group at a high magnification increases the effective F-number of the third lens group to render difficult the correction of the variation in spherical aberration. Conversely, when the third lens group is used at a low magnification, the amount of movement of the third lens group is decreased while the stroke of the second lens group is increased. Thus, proper setting of the focal length of the third lens group is essential. If the upper limit thereof is exceeded, the magnification changing system will become longer and if the lower limit is exceeded, spherical aberration will be corrected at the opposite ends of zooming but will still remain in the intermediate portion of the focal length, and such aberration will be difficult to correct.

Condition (4) specifies the focal length of the fourth lens group. The fourth lens group, together with the fifth lens group, constitute the so-called relay lens system by which the image point created by the magnification changing system is focused at the final image field. However, the fourth lens group substantially collimates the light flux converging at the image point created by the magnification changing system ranging up to the third lens group and causes such flux to enter the fifth lens group. Accordingly, the first to the fourth lens groups may be regarded as constituting an afocal system with respect to the fifth lens group as a master lens. Heretofore, this lens group, by being combined with the subsequent fifth lens group, has often been used to control the back focal distance and can correct the aberrations in each focal length. Therefore, if the upper limit of condition (4) is exceeded, it will be difficult to secure the back focal distance sufficiently. If the lower limit of condition (4) is exceeded, spherical aberration will become excessive toward the positive, and even if it is negated by the fifth lens group, there will still remain a high degree of spherical aberration and the negative power will become stronger so that Petzval sum will be excessive negative power and will become stronger; Petzval sum will be excessive toward the negative to render difficult the correction of curvature of image field.

Condition (5) specifies the focal length of the fifth lens group. As indicated, the fifth lens group, together with the fourth lens group, constitute the relay lens and the property thereof that the aberration with respect to each focal length is varied in the fashion of parallel movement is utilized to maintain the balance with the aberration created by the magnification changing system and correct the aberration in the final image field. The necessary back focal distance must also be secured, and further, the negative Petzval sum resulting from the magnification changing system being made as compact as possible must be negated by the positive Petzval sum of this lens group. For such reasons, this lens group has heretofore tended to become complicated in construction and has often employed a Petzval-type lens to provide positive Petzval sum. As already known, however, the Petzval-type lens has a considerably large full length for its focal length, and even if the size of the magnification changing system is reduced at all, the lens must be enlarged for the correction of the Petzval sum, but this is not effective to make the entire system compact.

To overcome the disadvantages outlined above, the fifth lens group is divided into forward and rearward lens groups with a large air space therebetween. The forward group bears almost all the power of the fifth lens group while, at the same time, it cooperates with the fourth lens group to correct the aberration in the neighborhood of the diaphragm. The rearward group is disposed as far back as possible to ensure a necessary minimum back focal distance and to provide substantially zero power, thereby effecting the correction of the non-axial aberration. In addition, by using glass of low refractive index for the positive lens and glass of high refractive index for the negative lens, the lens system of the invention has succeeded in providing a positive Petzval sum while providing a telephoto ratio of approximately 1.0 for the fifth lens group itself, whereby a relay lens is provided which is compact but which secures a necessary back focal distance, and which is simple in construction and effective in performance. Further, if the first to the fourth lens groups are regarded as an afocal system with respect to the fifth lens group, the focal length of the fifth lens group must be varied in accordance with the magnitude of the magnification of the afocal system with respect to the fifth lens group, even though the zoom ratio is identical between them. Therefore, if the upper limit of condition (5) is exceeded, the magnification changing system and the relay lens will both be longer and could not be arranged compactly. If the lower limit of this condition is exceeded, the negative Petzval sum created by the magnification changing system could not be corrected by the relay lens system, and correction of the curvature of image field over the entire range of the focal length would be difficult.

Description will hereinafter be made of the specific lens construction of the present invention with the power distributions selected in the manner hereinbefore described. The shape factor representing the shape of the lens is defined as $(r_F + r_R)/(r_F - r_R)$, where $r_F$ is the curvature radius of the lens surface on the object side and $r_R$ is the curvature radius of the lens surface on the image side, and the value of this shape factor is expressed as SF for the sake of convenience. It is to be understood that the first of the suffixes represent a group and the second suffix represents the order of the lens component in each group.

In a zoom lens system having a high zoom ratio and having a maximum focal length reaching the range of the so-called telephoto lens, the first lens group thereof is required to correct various aberrations, above all, chromatic aberration, and especially, the lateral chromatic aberration on the long focal length side which cannot be eliminated even by stopping down the diaphragm and which will adversely affect the image formation. It is therefore desirable that the following condition be satisfied:

$$\nu_{1p} - \nu_{1n} > 34 \tag{6}$$

where $\nu_{1p}$ represents the Abbe number of the positive component of the first lens group and $\nu_{1n}$ the Abbe number of the negative component of the first lens group, and whenever the secondary spectrum is taken into account, it is also desirable that the difference in partial variance ratio between the positive and the negative component be smaller. Further, when the properties of optical glass are taken into consideration, the use of a glass material which will satisfy these conditions will also prevent the Petzval sum in the magnification changing system from being aggravated toward the negative and it is thus desirable that the following conditions be satisfied:

$$N_{1p} < 1.55 \tag{7) and}$$

$$N_{1n} > 1.70 \qquad (8),$$

where $N_{1p}$ and $N_{1n}$ represent the refractive indices of the positive and negative components, respectively, of the first lens group. Also, in order that the spherical aberration and curvature of image field over the range from the infinity to the shortest distance on the long focal length side may be corrected in a well-balanced manner, it is desirable that the following conditions be satisfied:

$$-0.3 < SF_{11} < 0 \qquad (9) \text{ and}$$

$$-2.0 < SF_{12} < -1.0 \qquad (10),$$

where $SF_{11}$ and $SF_{12}$ represent the shape factors of the positive double lens component and the positive meniscus lens component forming the first lens group.

The second lens group should desirably be formed by two components; namely a negative single lens component and a negative doublet lens component, in order that the distortion and curvature of image field on the short focal length side and the spherical aberration on the long focal length side may be corrected in a well-balanced manner. The following conditions should be satisfied:

$$0.5 < SF_{21} < 2.0 \qquad (11) \text{ and}$$

$$-1.6 < SF_{22} < -0.5 \qquad (12),$$

where $SF_{21}$ and $SF_{22}$ represent the shape factors of the two components, respectively. The doublet lens component should preferably be disposed in the rear of the second lens group in order to well correct the lateral chromatic aberration on the short focal length side. Further, in order to ensure achromatization to be sufficiently accomplished, the following condition should be satisfied:

$$\nu_{2n} - \nu_{2p} > 23 \qquad (13),$$

where $\nu_{2p}$ and $\nu_{2n}$ represent the Abbe numbers of the positive lens and the negative lens forming the doublet lens component. Again in the second lens group, it is necessary to prevent the Petzval sum in the magnification changing system from being aggravated and, in order to ensure good correction of the spherical aberration on the long focal length side, the following condition should be satisfied:

$$N_{21} > 1.7 \qquad (14),$$

where $N_{21}$ represents the refractive index of the single negative lens components.

Since the third lens group is used in a state wherein its effective F-number over the entire range of magnification change is relatively small as compared with the other magnification changing groups, in this lens group it is important to correct the spherical aberration in each focal length in a well-balanced manner, it also playing the role of correcting the variation in chromatic aberration resulting from the variation in focal length, especially the variation in chromatic aberration in the intermediate focal length. The following condition should be satisfied:

$$-0.6 < SF_{32} < 0.0 \qquad (15),$$

where $SF_{32}$ represents the shape factor of the positive doublet lens component in the third lens group. If the lower limit of this condition is departed from, the spherical aberration will become excessive toward the positive while, at the same time, the axial chromatic aberration on the g-line as opposed to the d-line will become excessive toward the positive, and the lateral chromatic aberration will become excessive toward the negative. If the upper limit of this condition is exceeded, the contrary state will arise. In either case, it will be difficult to provide a proper balance of aberration. Also, for the purpose of achromatization, it is desirable that the following condition be satisfied:

$$\nu_{3p} - \nu_{3n} > 43 \qquad (16),$$

where $\nu_{3p}$ and $\nu_{3n}$ represent the Abbe numbers of the positive and the negative lens, respectively, in the third lens group. Again in the third lens group, it is further necessary to prevent the Petzval sum of the magnification changing system from being aggravated toward the negative and for this purpose, the following conditions should be satisfied:

$$N_{3p} < 1.55 \qquad (17) \text{ and}$$

$$N_{3n} > 1.75 \qquad (18),$$

where $N_{3p}$ and $N_{3n}$ represent the refractive indices of the positive and the negative lens in this group.

In order to correct the spherical aberration and the balance of coma over the entire range of the focal length, the fourth lens group should satisfy the condition:

$$-0.2 < SF_4 < 0.2 \qquad (19),$$

where $SF_4$ represents the shape factor of the negative lens component constituting the fourth lens group. The following condition should be satisfied in order to improve the Petzval sum in the fourth lens group:

$$N_4 > 1.7 \qquad (20),$$

where $N_4$ represents the refractive index of the negative lens component.

The fifth lens group is of a construction which differs from the conventional relay lens; it is simple and yet has a high performance. The fifth lens group comprises a forward group bearing almost all the power of this lens group and a rearward group having very little power and spaced apart from the forward group by a very substantial air space. This lens group should satisfy the following relation:

$$0.4 f_5 < D_5,$$

where $D_5$ is the air space between the forward and the rearward group, and $f_5$ is the focal length of the fifth lens group as a whole. By this condition being satisfied, the meridional plane and the sagittal plane resulting from the astigmatism can be adjusted to the Petzval plane in a well-balanced manner. The upper limit of the space $D_5$ may desirably be as great as allowable with respect to the limitation in the back focal distance so that correction of the aberration balance becomes easier. If the lower limit of the space $D_5$ is exceeded, the position at which the rearward group in the fifth lens group cuts the non-axial ray will be lowered to render it impossible to draw the astigmatism toward the negative. On the other hand, if the power of the negative lens component in the rearward group forming the fifth lens group is increased, the astigmatism may be drawn toward the positive while the air space $D_5$ is maintained small, but in such case the above-mentioned coma will become too excessive to be offset by the rearmost positive lens component and a high degree of coma will be created for each focal length condition so that it will be impossible to maintain a practicable aberration balance.

It is also desirable that the relation of the focal length $f'_5$ of the forward group with the focal length $f_5$ of the fifth lens group as a whole satisfy the following condition:

$$0.7f_5 < f'_5 < 1.0f_5 \qquad (21),$$

in order that the entire length of the fifth lens group itself may be maintained substantially equal to the focal length of the fifth lens group to thereby make the entire lens system as compact as possible. Further, for the correction of the spherical aberration and coma over the entire range of the focal length, the following condition should be satisfied:

$$-4.0 < SF_{51} < -1.0 \qquad (22),$$

where $SF_{51}$ is the shape factor of the positive lens component in the forward group. In order that the curvature of image field made excessive toward the negative chiefly in the magnification changing system may be drawn toward the positive, the negative meniscus lens component in the rearward group should desirably assume a shape which will satisfy the following condition:

$$-6.0 < SF_{52} < -2.0 \qquad (23),$$

where $SF_{52}$ is the shape factor of this negative meniscus lens component. Further, in order that the Petzval sum made negative in the magnification changing system may be negated and assume a proper value, the following conditions should be satisfied:

$$N_{5p} < 1.57 \qquad (24) \text{ and}$$

$$N_{5n} > 1.73 \qquad (25),$$

where $N_{5p}$ and $N_{5n}$ represents the refractive indices of the positive and negative components in the fifth lens group.

Preferred embodiments of the present invention will be shown below. Of course, in these embodiments, the conditions (1) to (25) shown above are all satisfied.

Figure 4:
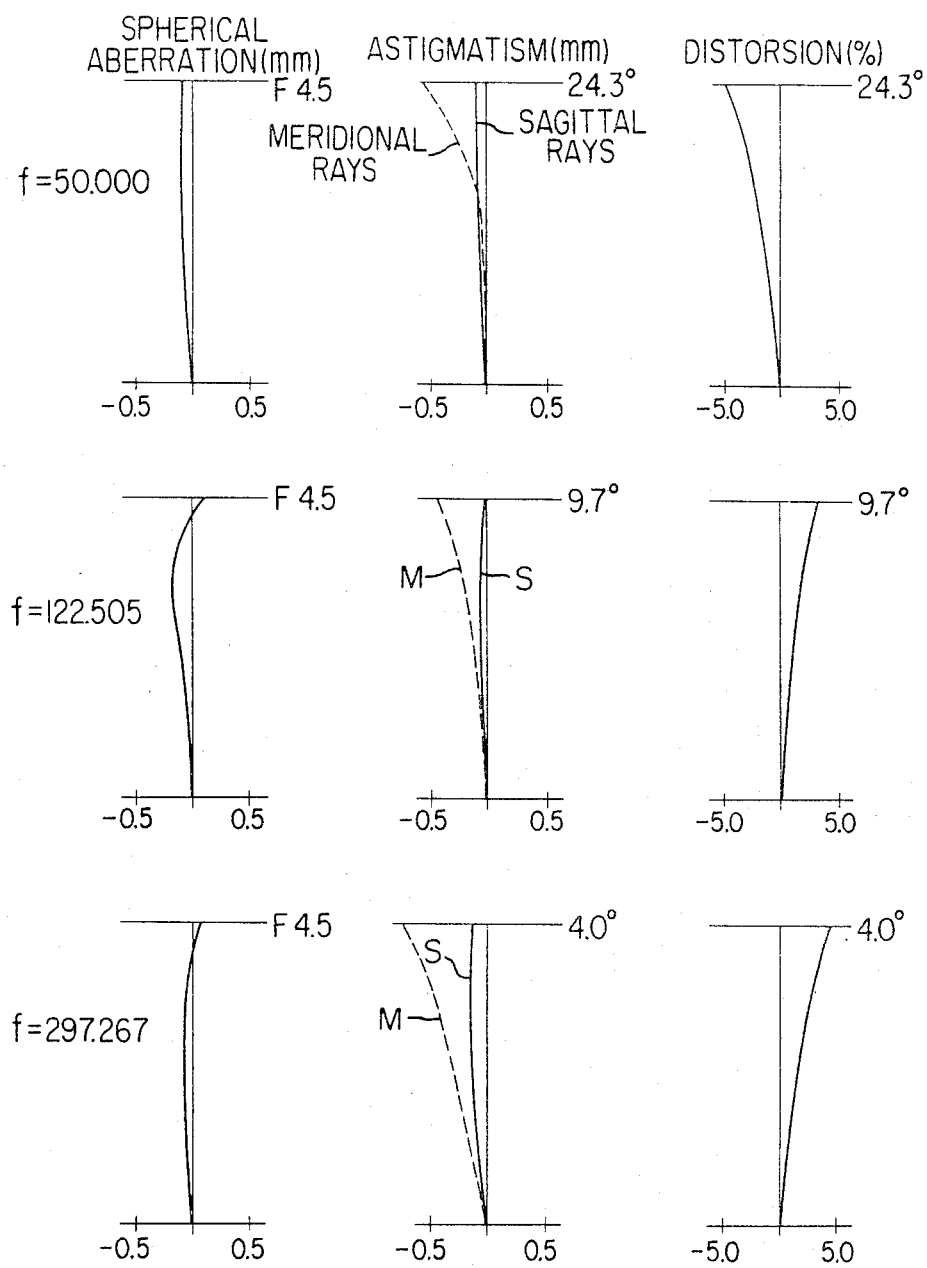
FIGS. 4, 5 and 6 illustrate various aberrations in the first, second and third embodiments, respectively, for the shortest, the intermediate and the longest focal length conditions.

The lens construction according to a first embodiment is shown in FIG. 1. In this embodiment, the following condition is satisfied:

$$0.7|f_2| < r_9 < 1.1|f_2| \qquad (26),$$

where $r_9$ represents the curvature radius of the cemented surface of the second lens group and $f_2$ the focal length of the second lens group as a whole, whereby the axial chromatic aberration over the entire range of magnification change is well balanced while, at the same time, correction of the lateral chromatic aberration especially on the short focal length side becomes easier. In the positive lens component in the third lens group which comprises a doublet, the following condition should be satisfied:

$$0.6f_3 < |r_{14}| < 1.0f_3 \qquad (27),$$

where $r_{14}$ represents the curvature radius of the cemented surface of the doublet and $f_3$ the focal length of the third lens group as a whole, whereby correction of the chromatic aberration in the intermediate focal length becomes easier. Further, by satisfying the following condition:

$$0.5 < SF_{31} < 0.8 \qquad (28),$$

where $SF_{31}$ is the shape factor of the single positive lens component in the third lens group, it is possible to more easily correct the balance of spherical aberration in the entire range of magnification change. Aberrations in the first embodiment for the shortest, the intermediate and the longest focal length condition are illustrated in FIG. 4, wherein it is seen that correction of aberrations has been accomplished very well for a compact zoom lens having a zoom ratio of 6.0 and a relative aperture of 1.4.5.

Figure 2:
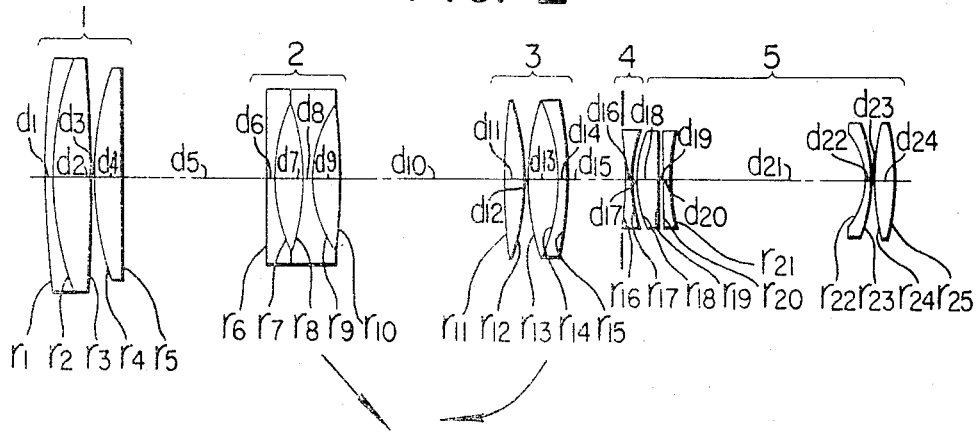
Figure 5:
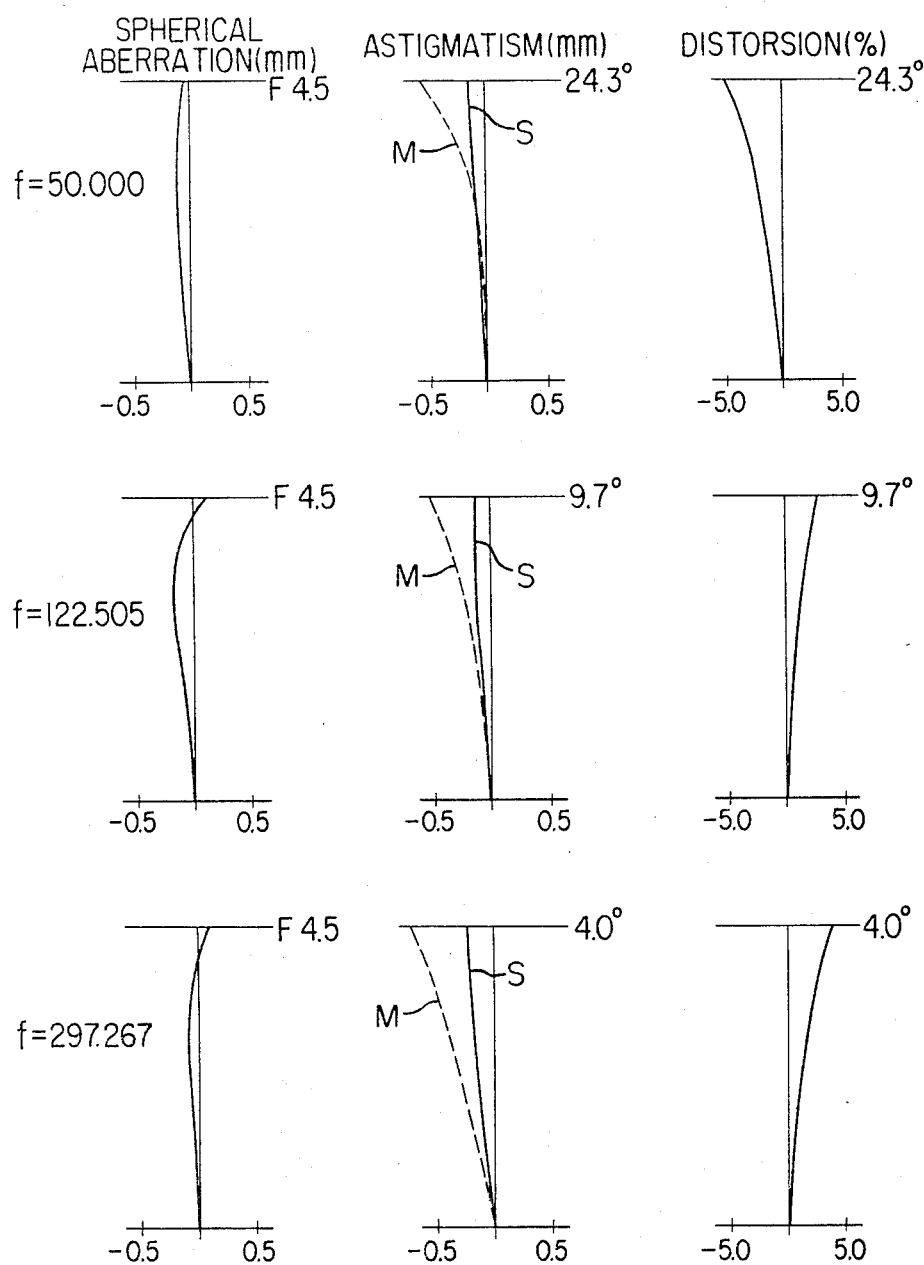

The lens construction according to a second embodiment is shown in FIG. 2. In this embodiment, the positive meniscus lens component forming the forward group in the fifth lens group and convex to the object side is divided into a positive meniscus lens convex to the object side and a negative lens without the power of the forward group being greatly varied, whereby the Petzval sum is drawn to the positive so that the Petzval sum of the entire system is improved. The aberrations in this second embodiment for the respective focal length conditions are illustrated in FIG. 5, from which it is seen that the aberrations are maintained as well as in the first embodiment.

Figure 3:
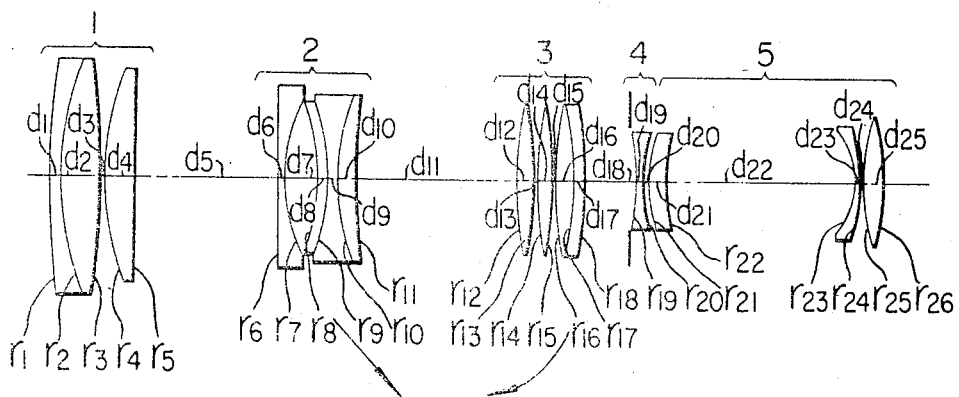
Figure 6:
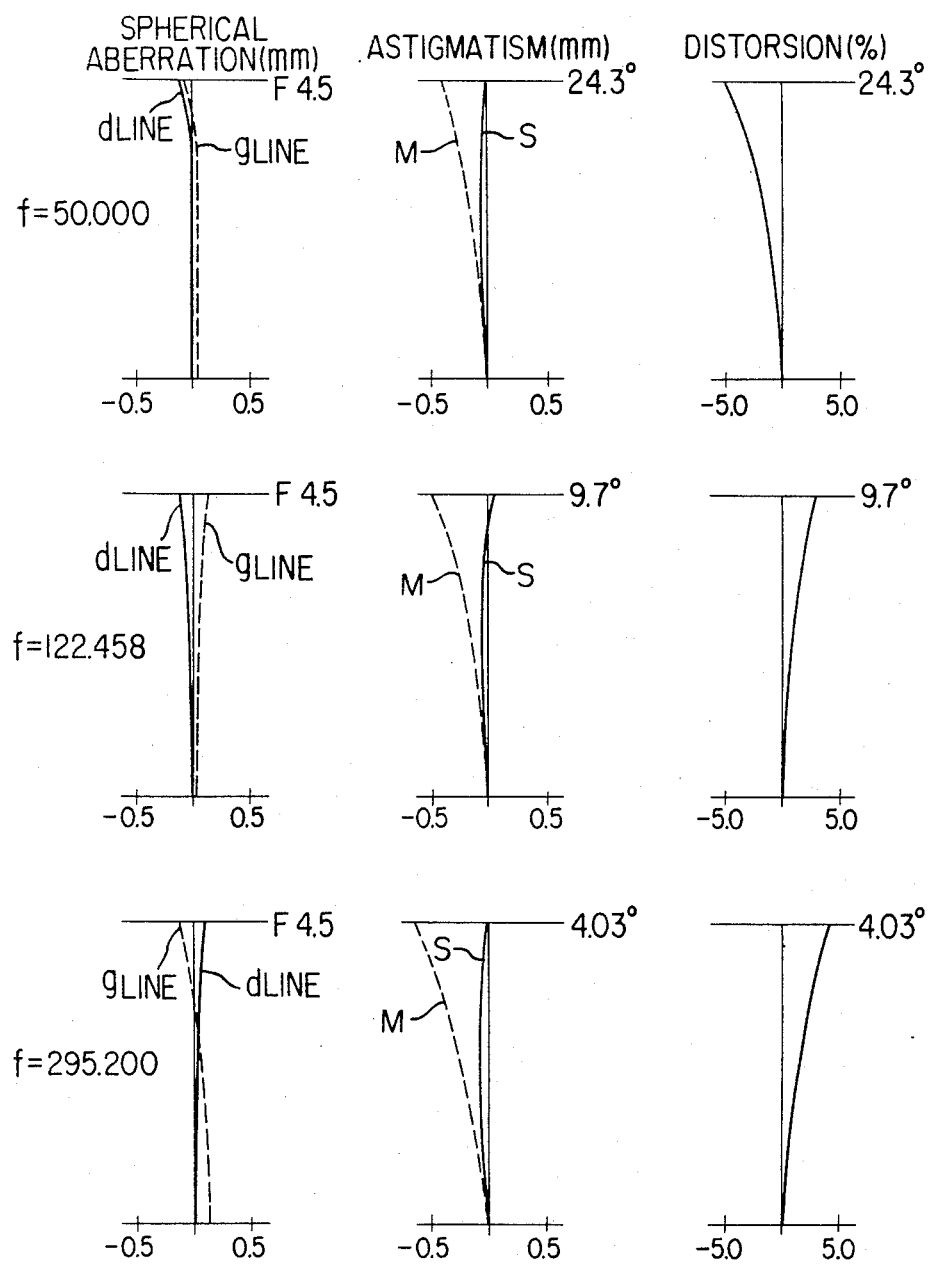

The lens construction according to a third embodiment is shown in FIG. 3. Here, the negative composite lens component in the second lens group is formed by a triplet comprising a positive meniscus lens concave to the object side, a biconcave negative lens and a positive meniscus lens convex to the object side, whereby the chromatic aberration resulting from the negatively excessive spherical aberration created by the cemented surface may be well corrected from the intermediate focal length to the long focal length. Also, the single positive lens component in the third lens group is divided into two single positive lenses to thereby enable the effective F-number of the third lens group to be secured more easily, and the resulting increase in the curvature radius of the cemented surface of the composite lens component may easily prevent the over-correction toward the positive of the g-line as opposed to the d-line in the spherical aberration from the short focal length to the long focal length. To realize such requirements, the following conditions should be satisfied:

$$0.0 < SF_{311} < 0.2 \qquad (29) \text{ and}$$

$$-0.5 < SF_{312} < -0.1 \qquad (30),$$

where $SF_{311}$ and $SF_{312}$ are the shape factors of the two divided positive lenses in the order from the object side. The aberrations in the third embodiment for the respective focal length conditions are illustrated in FIG. 6, wherein it is seen that as good a balance of aberration as in the other embodiments is maintained for any of the various focal length conditions.

In the zoom lens system according to the present invention as hereinbefore described, a proper power is arranged in each group and an appropriate lens construction in accordance therewith is accurately chosen, whereby a bright and compact zoom lens system is attained which is useful with 35 mm still cameras, which has a very short focal length beginning with the range of a standard lens, but has a high magnification; namely, a zoom ratio six times that of the standard lens, and which has a relative aperture of 1:4.5.

Numerical data for the above-described preferred embodiments of the present invention will be shown below. In each example, $r_i$ represents the curvature radius of each lens, $d_i$ the center thickness of each lens or the air space between adjacent lenses, $N_i$ the refractive index of the glass of each lens for the d-line, and $v_i$ the Abbe number of the glass of each lens.

EXAMPLE 1

| f = 50.000–297.267 | | F/4.5 | |
|---|---|---|---|
| zoom ratio = 5.945 | | Angle of view 48.6°–8.0° | |
| i | $r_i$ | $d_i$ | $N_i$ | $v_i$ |

| i | $r_i$ | $d_i$ | $N_i$ | $v_i$ |
|---|---|---|---|---|
| 1 | 308.300 | 2.0 | 1.74950 | 35.0 |
| 2 | 111.000 | 12.0 | 1.50032 | 81.9 |
| 3 | −388.141 | 0.2 | | |
| 4 | 106.700 | 8.0 | 1.52000 | 70.1 |
| 5 | 2072.540 | $d_5$ | | |
| 6 | 2900.000 | 2.0 | 1.71300 | 53.9 |
| 7 | 46.959 | 9.2 | | |
| 8 | −65.200 | 2.0 | 1.62041 | 60.3 |
| 9 | 39.920 | 7.1 | 1.68893 | 31.1 |
| 10 | −511.394 | $d_{10}$ | | |
| 11 | 415.900 | 5.1 | 1.52000 | 70.1 |
| 12 | −83.802 | 0.2 | | |
| 13 | 68.500 | 10.2 | 1.52000 | 70.1 |
| 14 | −48.650 | 2.0 | 1.80518 | 25.5 |
| 15 | −97.436 | $d_{15}$ | | |
| 16 | −123.500 | 2.0 | 1.71300 | 53.9 |
| 17 | 92.434 | 1.502 | | |
| 18 | 35.470 | 5.4 | 1.56138 | 45.3 |
| 19 | 88.858 | 58.5 | | |
| 20 | −21.321 | 2.4 | 1.76684 | 46.6 |
| 21 | −34.769 | 0.2 | | |
| 22 | 78.649 | 5.4 | 1.51823 | 59.0 |
| 23 | −131.454 | | | |

| f | 50.000 | 122.505 | 297.267 |
|---|---|---|---|
| $d_5$ | 1.107 | 41.977 | 67.285 |
| $d_{10}$ | 104.031 | 48.890 | 2.247 |
| $d_{15}$ | 4.512 | 18.783 | 40.116 |

$$f_1 = 164.325 = 3.287\ fW$$
$$f_2 = -45.376 = -0.908\ fW$$
$$f_3 = 58.702 = 1.174\ fW$$
$$f_4 = -73.861 = -1.477\ fW$$
$$f_5 = 115.643 = 2.313\ fW$$

Full length = 285.122  Back focal distance = 40.071
Diaphragm disposed 2.0mm ahead of the 16th surface

EXAMPLE 2

| f = 50.000–297.264 | | F/4.5 | |
|---|---|---|---|
| zoom ratio = 5.945 | | Angle of view 48.6°–8.0° | |

| i | $r_i$ | $d_i$ | $N_i$ | $v_i$ |
|---|---|---|---|---|
| 1 | 308.300 | 2.0 | 1.74950 | 35.0 |
| 2 | 111.000 | 12.0 | 1.50032 | 81.9 |
| 3 | −388.141 | 0.2 | | |
| 4 | 106.700 | 8.0 | 1.52000 | 70.1 |
| 5 | 2072.540 | $d_5$ | | |
| 6 | 2900.000 | 2.0 | 1.71300 | 53.9 |
| 7 | 46.959 | 9.2 | | |
| 8 | −65.200 | 2.0 | 1.62041 | 60.3 |
| 9 | 39.920 | 7.1 | 1.68893 | 31.1 |
| 10 | −511.393 | $d_{10}$ | | |
| 11 | 415.900 | 5.1 | 1.52000 | 70.1 |
| 12 | −83.802 | 0.2 | | |
| 13 | 68.500 | 10.2 | 1.52000 | 70.1 |
| 14 | −48.650 | 2.0 | 1.80518 | 25.5 |
| 15 | −97.436 | $d_{15}$ | | |
| 16 | −132.000 | 2.0 | 1.69350 | 53.6 |
| 17 | 84.224 | 1.542 | | |
| 18 | 35.200 | 5.5 | 1.53256 | 46.0 |
| 19 | 401.093 | 1.0 | | |
| 20 | 941.600 | 2.0 | 1.74443 | 49.4 |
| 21 | 135.500 | 57.5 | | |
| 22 | −21.470 | 2.5 | 1.76684 | 46.6 |
| 23 | −35.094 | 0.2 | | |
| 24 | 70.000 | 5.5 | 1.51783 | 61.1 |
| 25 | −137.617 | | | |

| f | 50.000 | 122.505 | 297.264 |
|---|---|---|---|
| $d_5$ | 1.107 | 41.977 | 67.286 |
| $d_{10}$ | 104.031 | 48.890 | 2.247 |
| $d_{15}$ | 4.459 | 16.729 | 38.063 |

$$f_1 = 164.325 = 3.287\ fW$$
$$f_2 = -45.376 = -0.908\ fW$$
$$f_3 = 58.702 = 1.174\ fW$$
$$f_4 = -73.861 = -1.477\ fW$$
$$f_5 = 115.643 = 2.313\ fW$$

Full length = 286.804  Back focal distance = 39.466
Diaphragm disposed 2.0mm ahead of the 16th surface

EXAMPLE 3

| f = 50.000–295.200 | | F/4.5 | |
|---|---|---|---|
| zoom ratio = 5.904 | | Angle of view 48.6°–8.06° | |

| i | $r_i$ | $d_i$ | $N_i$ | $v_i$ |
|---|---|---|---|---|
| 1 | 308.300 | 2.0 | 1.74950 | 35.0 |
| 2 | 112.000 | 12.5 | 1.50032 | 81.9 |
| 3 | −401.400 | 0.2 | | |
| 4 | 107.800 | 8.5 | 1.52000 | 70.1 |
| 5 | 2970.199 | $d_5$ | | |
| 6 | 3512.50 | 2.0 | 1.71300 | 53.9 |
| 7 | 48.500 | 9.6 | | |
| 8 | −62.150 | 3.5 | 1.66998 | 39.2 |
| 9 | −48.310 | 2.0 | 1.56384 | 60.8 |
| 10 | 63.040 | 5.1 | 1.80518 | 25.5 |
| 11 | 447.757 | $d_{11}$ | | |
| 12 | 139.600 | 5.2 | 1.52000 | 70.1 |
| 13 | −109.444 | 0.2 | | |
| 14 | 109.000 | 4.5 | 1.52000 | 70.1 |
| 15 | −208.886 | 0.2 | | |
| 16 | 158.100 | 6.3 | 1.52000 | 70.1 |
| 17 | −70.590 | 2.0 | 1.80518 | 25.5 |
| 18 | −393.102 | $d_{18}$ | | |
| 19 | −116.300 | 2.0 | 1.71300 | 53.9 |
| 20 | 99.709 | 0.963 | | |
| 21 | 33.760 | 5.2 | 1.56732 | 42.8 |
| 22 | 82.393 | 54.7 | | |
| 23 | −20.400 | 2.3 | 1.76684 | 46.6 |
| 24 | −33.267 | 0.2 | | |
| 25 | 75.250 | 5.2 | 1.51823 | 59.0 |
| 26 | −124.176 | | | |

| f | 50.000 | 122.458 | 295.200 |
|---|---|---|---|
| $d_5$ | 1.879 | 41.998 | 66.699 |
| $d_{11}$ | 102.313 | 47.342 | 0.629 |
| $d_{18}$ | 3.249 | 18.099 | 40.111 |

$$f_1 = 164.325 = 3.287\ fW$$
$$f_2 = -45.963 = -0.919\ fW$$
$$f_3 = 59.461 = 1.189\ fW$$
$$f_4 = -75.004 = -1.500\ fW$$
$$f_5 = 110.645 = 2.213\ fW$$

-continued

| | | | | |
|---|---|---|---|---|
| f = 50.000–295.200 | | F/4.5 | | |
| zoom ratio = 5.904 | | Angle of view 48.6°–8.06° | | |
| i | $r_i$ | $d_i$ | $N_i$ | $\nu_i$ |

Full length = 281.535  Back focal distance = 39.732
Diaphragm disposed 2.0mm ahead of the 19th surface

What is claimed is:

1. A zoom lens system comprising, in the order from the object side;
   a positive first lens group including a positive lens component comprising a negative and a positive lens cemented together, and a positive meniscus lens component convex to the object side;
   a negative second lens group including a negative lens component and a negative lens component comprising a negative lens and at least one positive lens cemented together;
   a positive third lens group including at least one positive lens component and a positive lens component comprising a positive and a negative lens cemented together;
   a negative fourth lens group including a negative lens component; and
   a positive fifth lens group comprising a forward and a rearward group spaced a substantial distance apart from each other by an air space, said forward group including a positive meniscus lens component convex to the object side, said forward group bearing almost all of the power of the fifth lens group, said rearward group including a negative meniscus lens component convex to the image side and a positive lens component,
   said first lens group being movable on the optical axis of the system to perform the focusing function, said second lens group being linearly movable on said optical axis and cooperable with said third lens group non-linearly movable simultaneously with, but in the opposite direction to, said second lens group to perform the magnification changing function of maintaining a predetermined image field position while converging the light flux over the entire magnification changing range, said fourth and said fifth lens groups being fixed for said magnification change and said focusing to thereby form a relay lens.

2. A zoom lens system according to claim 1, wherein said forward group in said fifth lens group further includes a negative lens.

3. A zoom lens system according to claim 1, wherein said second lens group includes a negative lens component and a negative lens component comprising a triplet consisting of a positive meniscus lens convex to the image side, a biconcave lens and a positive lens cemented together, and said third lens group includes two positive lens components and a positive lens component comprising a positive and a negative lens cemented together.

4. A zoom lens system according to claim 1, wherein the following conditions are satisfied:

$2.9fW < f_1 < 3.7fW,$ $0.8fW < |f_2| < 1.1fW,$ $1.0fW < f_3 < 1.4fW,$ $1.4fW < |f_4| < 1.7fW,$ and $2.0fW < f_5 < 2.4fW,$ where $f_1$, $f_2$, $f_3$, $f_4$ and $f_5$ represent the focal lengths of said first, second, third, fourth and fifth lens groups, respectively, and fW represents the shortest focal length of the entire lens system; wherein the zoom lens system is for use with 35 mm camera having an F-number of about 4.5 and a zoom ratio of about 6.0; wherein the following conditions are satisfied:

$0.7f_5 < f'_5 < 1.0f_5$ and $0.4f_5 < D_5,$ where $f'_5$ represents the focal length of the forward group in said fifth lens group, and $D_5$ the air space between the forward and the rearward group in said fifth lens group; wherein the following conditions are satisfied;

$\nu_{1p} - \nu_{1n} > 34,$ $N_{1p} < 1.55,$ $N_{1n} > 1.70,$ $-0.3 < SF_{11} < 0.0,$ $-2.0 < SF_{12} < -1.0,$ $0.5 < SF_{21} < 2.0,$ $-1.6 < SF_{22} < -0.5,$ $\nu_{2n} - \nu_{2p} > 23,$ $N_{21} > 1.7,$ $-0.6 < SF_{32} < 0.0,$ $\nu_{3p} - \nu_{3n} > 43,$ $N_{3p} < 1.55,$ $N_{3n} > 1.75,$ $-0.2 < SF_4 < 0.2,$ $N_4 > 1.7,$ $-4.0 < SF_{51} < -1.0,$ $-6.0 < SF_{52} < -2.0,$ $N_{5p} < 1.57$ and $N_{5n} > 1.73,$ where $\nu$ and N represent the Abbe number and refractive index, respectively, of each lens component, SF represents the shape factor of each lens component, the first of the suffix numbers represents the lens group to which each lens component belongs, the second of the suffix numbers represents the order of each lens component in each lens group from the object side, n and p signify a negative lens and a positive lens, and the shape factor is defined as $SF = (r_F + r_R)/(r_F = r_R)$, where $r_F$ is the curvature radius of the surface of each lens component which faces the object side, and $r_R$ is the curvature radius of the surface of each lens which faces the image side; the zoom lens system having the following numerical data:

| f = 50.000-297.267 zoom ratio = 5.945 | | F/4.5 Angle of view 48.6°-8.0° | |
|---|---|---|---|
| i | $r_i$ | $d_i$ | $N_i$ | $\nu_i$ |
| 1 | 308.300 | 2.0 | 1.74950 | 35.0 |
| 2 | 111.000 | 12.0 | 1.50032 | 81.9 |
| 3 | −388.141 | 0.2 | | |
| 4 | 106.700 | 8.0 | 1.52000 | 70.1 |
| 5 | 2072.540 | $d_5$ | | |
| 6 | 2900.000 | 2.0 | 1.71300 | 53.9 |
| 7 | 46.959 | 9.2 | | |
| 8 | −65.200 | 2.0 | 1.62041 | 60.3 |
| 9 | 39.920 | 7.1 | 1.68893 | 31.1 |
| 10 | −511.394 | $d_{10}$ | | |
| 11 | 415.900 | 5.1 | 1.52000 | 70.1 |
| 12 | −83.802 | 0.2 | | |
| 13 | 68.500 | 10.2 | 1.52000 | 70.1 |
| 14 | −48.650 | 2.0 | 1.80518 | 25.5 |
| 15 | −97.436 | $d_{15}$ | | |
| 16 | −123.500 | 2.0 | 1.71300 | 53.9 |
| 17 | 92.434 | 1.502 | | |
| 18 | 35.470 | 5.4 | 1.56138 | 45.3 |
| 19 | 88.858 | 58.5 | | |
| 20 | −21.321 | 2.4 | 1.76684 | 46.6 |
| 21 | −34.769 | 0.2 | | |
| 22 | 78.649 | 5.4 | 1.51823 | 59.0 |
| 23 | −131.454 | | | |
| f | 50.000 | 122.505 | 297.267 |
| $d_5$ | 1.107 | 41.977 | 67.285 |
| $d_{10}$ | 104.031 | 48.890 | 2.247 |
| $d_{15}$ | 4.512 | 18.783 | 40.116 |

$f_1 = 164.325 = 3.287 \, fW$
$f_2 = -45.376 = -0.908 \, fW$
$f_3 = 58.702 = 1.174 \, fW$
$f_4 = -73.861 = -1.477 \, fW$
$f_5 = 115.643 = 2.313 \, fW$

Full length = 285.122 Back focal distance = 40.071
Diaphragm disposed 2.0mm ahead of the 16th surface.

where $r_i$ represents the curvature radius of each lens, $d_i$ the center thickness of each lens of the air space between adjacent lenses, $N_i$ the refractive index of the glass of each lens for the d-line, and $\nu_i$ the Abbe number of the glass of each lens.

5. A zoom lens system according to claim 1, wherein the following conditions are satisfied:

$2.9fW < f_1 < 3.7fW$, $0.8fW < |f_2| < 1.1fW$, $1.0fW < f_3 < 1.4fW$, $1.4fW < |f_4| < 1.7fW$, and $2.0fW < f_5 < 2.4fW$, where $f_1$, $f_2$, $f_3$, $f_4$ and $f_5$ represent the focal lengths of said first, second, third, fourth and fifth lens groups, respectively, and fW represents the shortest focal length of the entire lens system; wherein the zoom lens system is for use with 35 mm camera having an F-number of about 4.5 and a zoom ratio of about 6.0; wherein the following conditions are satisfied:

$0.7f_5 < f'_5 < 1.0f_5$ and $0.4f_5 < D_5$, where $f'_5$ represents the focal length of the forward group in said fifth lens group, and $D_5$ the air space between the forward and the rearward group in said fifth lens group; wherein the following conditions are satisfied;

$\nu_{1p} - \nu_{1n} > 34$, $N_{1p} < 1.55$, $N_{1n} > 1.70$, $-0.3 < SF_{11} < 0.0$, $-2.0 < SF_{12} < -1.0$, $0.5 < SF_{21} < 2.0$, $-1.6 < SF_{22} < -0.5$, $\nu_{2n} - \nu_{2p} > 23$, $N_{21} > 1.7$, $-0.6 < SF_{32} < 0.0$, $\nu_{3p} - \nu_{3n} > 43$, $N_{3p} < 1.55$, $N_{3n} > 1.75$, $-0.2 < SF_4 < 0.2$, $N_4 > 1.7$, $-4.0 < SF_{51} < -1.0$, $-6.0 < SF_{52} < -2.0$, $N_{5p} < 1.57$ and $N_{5n} > 1.73$, where $\nu$ and N represent the Abbe number and refractive index, respectively, of each lens component, SF represents the shape factor of each lens component, the first of the suffix numbers represents the lens group to which each lens component belongs, the second of the suffix numbers represents the order of each lens component in each lens group from the object side, n and p signify a negative lens and a positive lens, and the shape factor is defined as $SF = (r_F + r_R)/(r_F - r_R)$, where $r_F$ is the curvature radius of the surface of each lens component which faces the object side, and $r_R$ is the curvature radius of the surface of each lens which faces the image side; the zoom lens system having the following numerical data:

| f = 50.000-297.264 zoom ratio = 5.945 | | F/4.5 Angle of view 48.6°-8.0° | |
|---|---|---|---|
| i | $r_i$ | $d_i$ | $N_i$ | $\nu_i$ |
| 1 | 308.300 | 2.0 | 1.74950 | 35.0 |
| 2 | 111.000 | 12.0 | 1.50032 | 81.9 |
| 3 | −388.141 | 0.2 | | |
| 4 | 106.700 | 8.0 | 1.52000 | 70.1 |
| 5 | 2072.540 | $d_5$ | | |
| 6 | 2900.000 | 2.0 | 1.71300 | 53.9 |
| 7 | 46.959 | 9.2 | | |
| 8 | −65.200 | 2.0 | 1.62041 | 60.3 |
| 9 | 39.920 | 7.1 | 1.68893 | 31.1 |
| 10 | −511.393 | $d_{10}$ | | |
| 11 | 415.900 | 5.1 | 1.52000 | 70.1 |
| 12 | −83.802 | 0.2 | | |

-continued

| f = 50.000–297.264 | | F/4.5 | |
|---|---|---|---|
| zoom ratio = 5.945 | | Angle of view 48.6°–8.0° | |
| i | $r_i$ | $d_i$ | $N_i$ | $\nu_i$ |
| 13 | 68.500 | 10.2 | 1.52000 | 70.1 |
| 14 | −48.650 | 2.0 | 1.80518 | 25.5 |
| 15 | −97.436 | $d_{15}$ | | |
| 16 | −132.000 | 2.0 | 1.69350 | 53.6 |
| 17 | 84.224 | 1.542 | | |
| 18 | 35.200 | 5.5 | 1.53256 | 46.0 |
| 19 | 401.093 | 1.0 | | |
| 20 | 941.600 | 2.0 | 1.74443 | 49.4 |
| 21 | 135.500 | 57.5 | | |
| 22 | −21.470 | 2.5 | 1.76684 | 46.6 |
| 23 | −35.094 | 0.2 | | |
| 24 | 70.000 | 5.5 | 1.51783 | 61.1 |
| 25 | −137.617 | | | |

| f | 50.000 | 122.505 | 297.264 |
|---|---|---|---|
| $d_5$ | 1.107 | 41.977 | 67.286 |
| $d_{10}$ | 104.031 | 48.890 | 2.247 |
| $d_{15}$ | 4.459 | 16.729 | 38.063 |

$f_1 = 164.325 = 3.287\ fW$
$f_2 = -45.376 = -0.908\ fW$
$f_3 = 58.702 = 1.174\ fW$
$f_4 = -73.861 = -1.477\ fW$
$f_5 = 115.643 = 2.313\ fW$

Full length = 286.804 Back focal distance = 39.466
Diaphragm disposed 2.0mm ahead of the 16th surface, where $r_i$ represents the curvature radius of each lens, $d_i$ the center thickness of each lens or the air space between adjacent lenses, $N_i$ the refractive index of the glass of each lens for the d-line and $\nu_i$ the Abbe number of the glass of each lens.

6. A zoom lens system according to claim 1, wherein the following conditions are satisfied:

$2.9 fW < f_1 < 3.7 fW$, $0.8 fW < |f_2| < 1.1 fW$, $1.0 fW < f_3 < 1.4 fW$, $1.4 fW < |f_4| < 1.7 fW$, and $2.0 fW < f_5 < 2.4 fW$, where $f_1$, $f_2$, $f_3$, $f_4$ and $f_5$ represent the focal lengths of said first, second, third, fourth and fifth lens groups, respectively, and fW represents the shortest focal length of the entire lens system; wherein the zoom lens system is for use with 35 mm camera having an F-number of about 4.5 and a zoom ratio of about 6.0; wherein the following conditions are satisfied:

$0.7 f_5 < f'_5 < 1.0 f_5$ and $0.4 f_5 < D_5$, where $f'_5$ represents the focal length of the forward group in said fifth lens group, and $D_5$ the air space between the forward and rearward group in said fifth lens group; wherein the following conditions are satisfied;

$\nu_{1p} - \nu_{1n} > 34$, $N_{1p} < 1.55$, $N_{1n} > 1.70$, $-0.3 < SF_{11} < 0.0$, $-2.0 < SF_{12} < -1.0$, $0.5 < SF_{21} < 2.0$, $-1.6 < SF_{22} < -0.5$, $\nu_{2n} - \nu_{2p} > 23$, $N_{21} > 1.7$, $-0.6 < SF_{32} < 0.0$, $\nu_{3p} - \nu_{3n} > 43$, $N_{3p} < 1.55$, $N_{3n} > 1.75$, $-0.2 < SF_4 < 0.2$, $N_4 > 1.7$, $-4.0 < SF_{51} < -1.0$, $-6.0 < SF_{52} < -2.0$, $N_{5p} < 1.57$ and $N_{5n} > 1.73$, where $\nu$ and $N$ represent the Abbe number and refractive index, respectively, of each lens component, SF represents the shape factor of each lens component, the first of the suffix numbers represents the lens group to which each lens component belongs, the second of the suffix numbers represents the order of each lens component in each lens group from the object side, n and p signify a negative lens and a positive lens, and the shape factor is defined as $SF = (r_F + r_R)/(r_F - r_R)$, where $r_F$ is the curvature radius of the surface of each lens component which faces the object side, and $r_R$ is the curvature radius of the surface of each lens which faces the image side; the zoom lens system having the following numerical data:

| f = 50.000–295.200 | | F/4.5 | |
|---|---|---|---|
| zoom ratio = 5.904 | | Angle of view 48.6°–8.06° | |
| i | $r_i$ | $d_i$ | $N_i$ | $\nu_i$ |
| 1 | 308.300 | 2.0 | 1.74950 | 35.0 |
| 2 | 112.000 | 12.5 | 1.50032 | 81.9 |
| 3 | −401.400 | 0.2 | | |
| 4 | 107.800 | 8.5 | 1.52000 | 70.1 |
| 5 | 2970.199 | $d_5$ | | |
| 6 | 3512.50 | 2.0 | 1.71300 | 53.9 |
| 7 | 48.500 | 9.6 | | |
| 8 | −62.150 | 3.5 | 1.66998 | 39.2 |
| 9 | −48.310 | 2.0 | 1.56384 | 60.8 |
| 10 | 63.040 | 5.1 | 1.80518 | 25.5 |
| 11 | 447.757 | $d_{11}$ | | |
| 12 | 139.600 | 5.2 | 1.52000 | 70.1 |
| 13 | −109.444 | 0.2 | | |
| 14 | 109.000 | 4.5 | 1.52000 | 70.1 |
| 15 | −208.886 | 0.2 | | |
| 16 | 158.100 | 6.3 | 1.52000 | 70.1 |
| 17 | −70.590 | 2.0 | 1.80518 | 25.5 |
| 18 | −393.102 | $d_{18}$ | | |
| 19 | −116.300 | 2.0 | 1.71300 | 53.9 |
| 20 | 99.709 | 0.963 | | |
| 21 | 33.760 | 5.2 | 1.56732 | 42.8 |
| 22 | 82.393 | 54.7 | | |
| 23 | −20.400 | 2.3 | 1.76684 | 46.6 |
| 24 | −33.267 | 0.2 | | |

-continued

| f = 50.000–295.200 | | F/4.5 | |
|---|---|---|---|
| zoom ratio = 5.904 | | Angle of view 48.6°–8.06° | |
| i | $r_i$ | $d_i$ | $N_i$ | $\nu_i$ |
|---|---|---|---|---|
| 25 | 75.250 | 5.2 | 1.51823 | 59.0 |
| 26 | −124.176 | | | |

| f | 50.000 | 122.458 | 295.200 |
|---|---|---|---|
| $d_5$ | 1.879 | 41.998 | 66.699 |
| $d_{11}$ | 102.313 | 47.342 | 0.629 |
| $d_{18}$ | 3.249 | 18.099 | 40.111 |

$f_1 = 164.325 = 3.287\ fW$

-continued

| f = 50.000–295.200 | | F/4.5 | |
|---|---|---|---|
| zoom ratio = 5.904 | | Angle of view 48.6°–8.06° | |
| i | $r_i$ | $d_i$ | $N_i$ | $\nu_i$ |

$f_2 = -45.963 = -0.919\ fW$
$f_3 = 59.461 = 1.189\ fW$
$f_4 = -75.004 = -1.500\ fW$
$f_5 = 110.645 = 2.213\ fW$

Full length = 281.535 Back focal distance = 39.732
Diaphragm disposed 2.0mm ahead of the 19th surface.

where $r_i$ represents the curvature radius of each lens, $d_i$ the center thickness of each lens or the air space between adjacent lenses, $N_i$ the refractive index of the glass of each lens for the d-line, and $\nu_i$ the Abbe number of the glass of each lens.

* * * * *